United States Patent Office 3,792,145
Patented Feb. 12, 1974

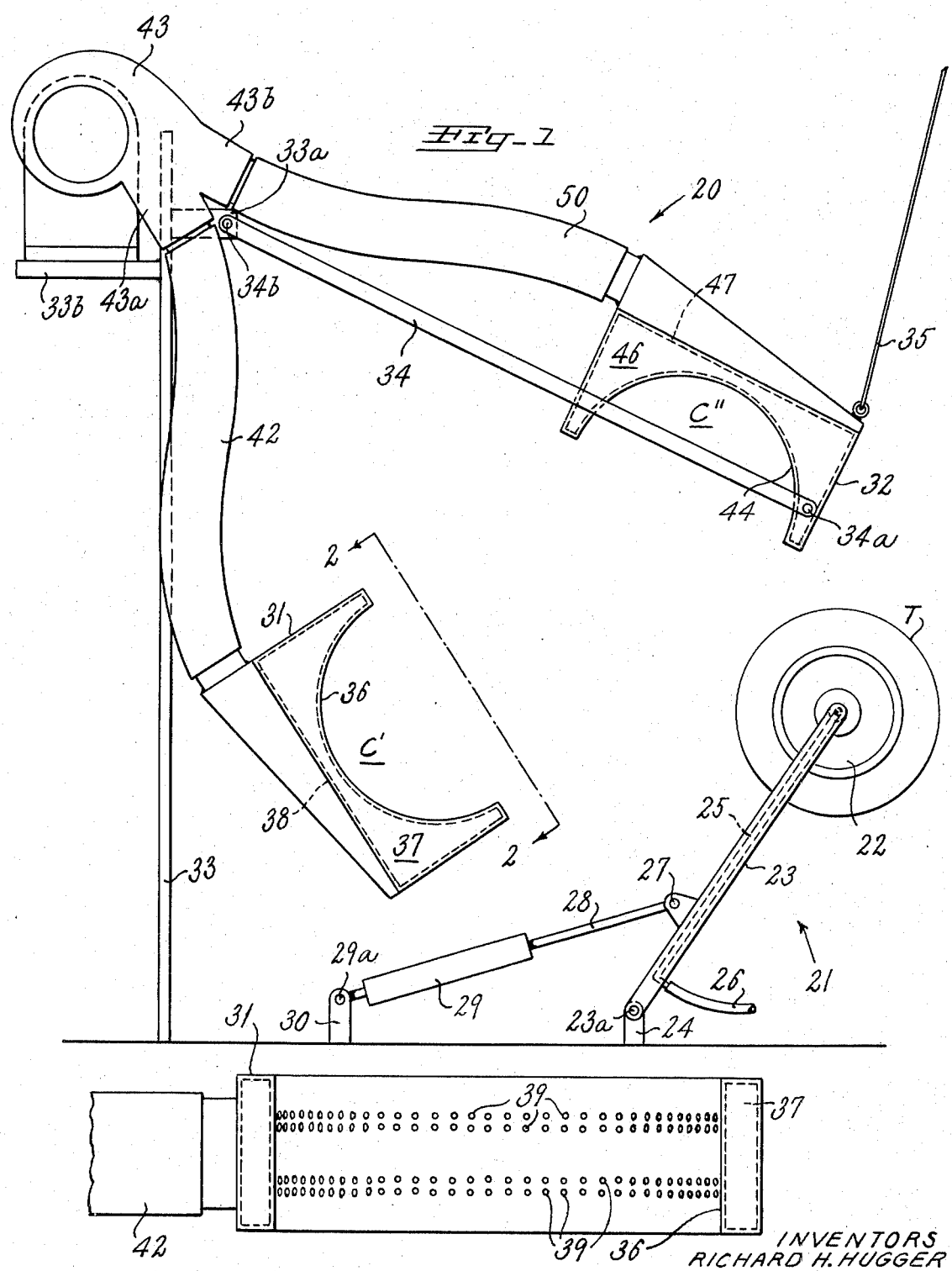

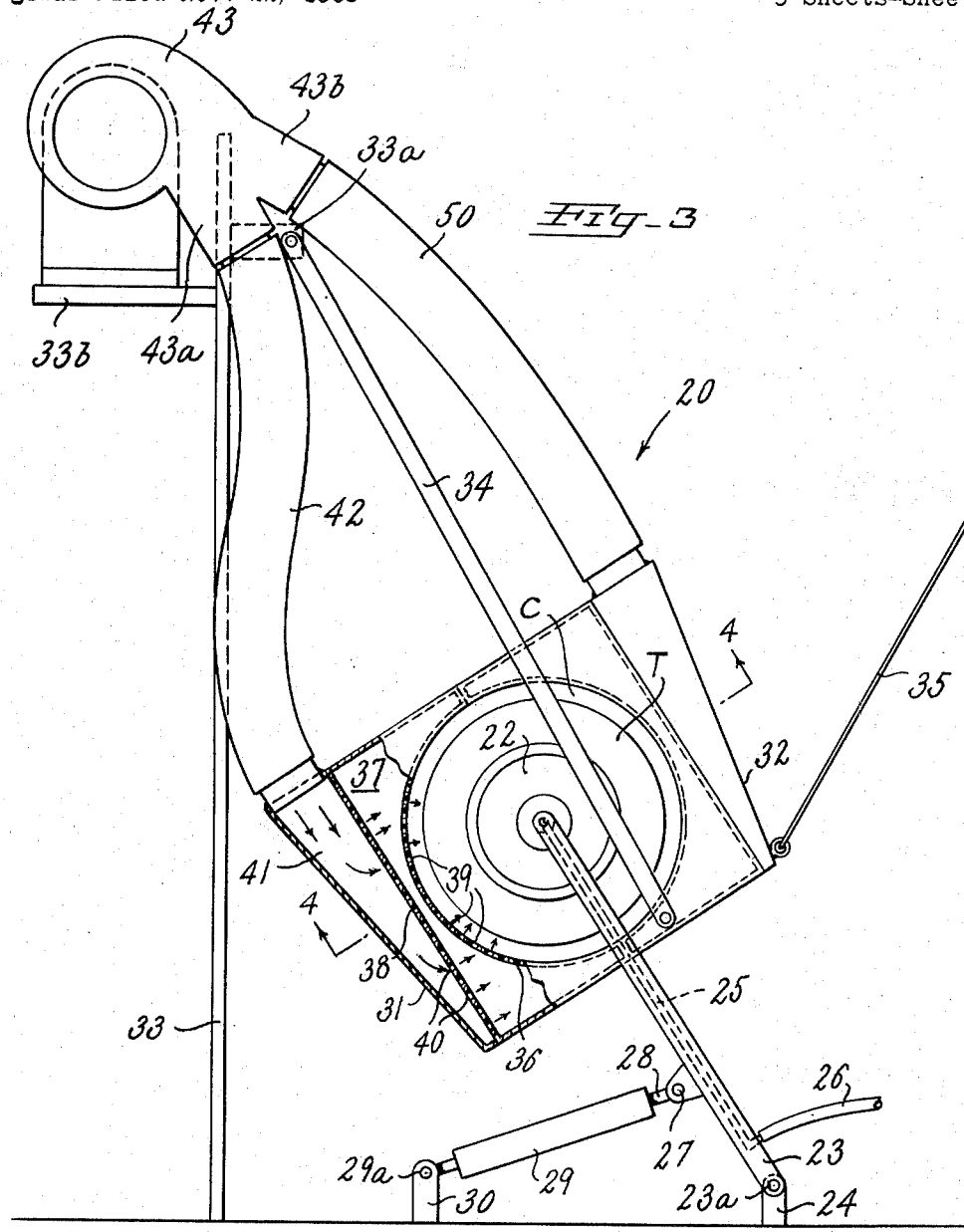
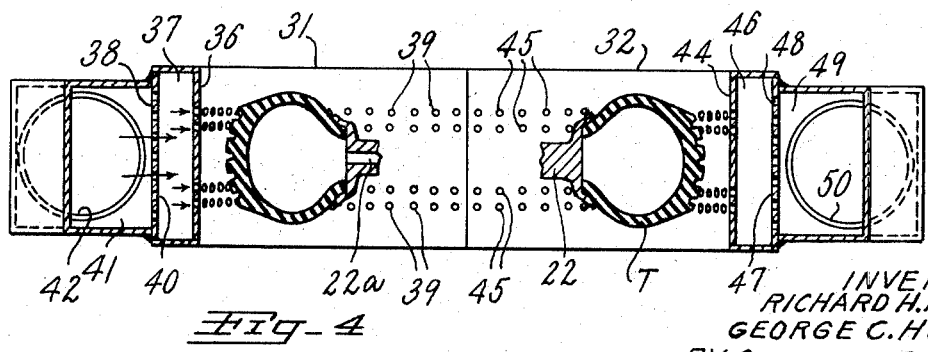

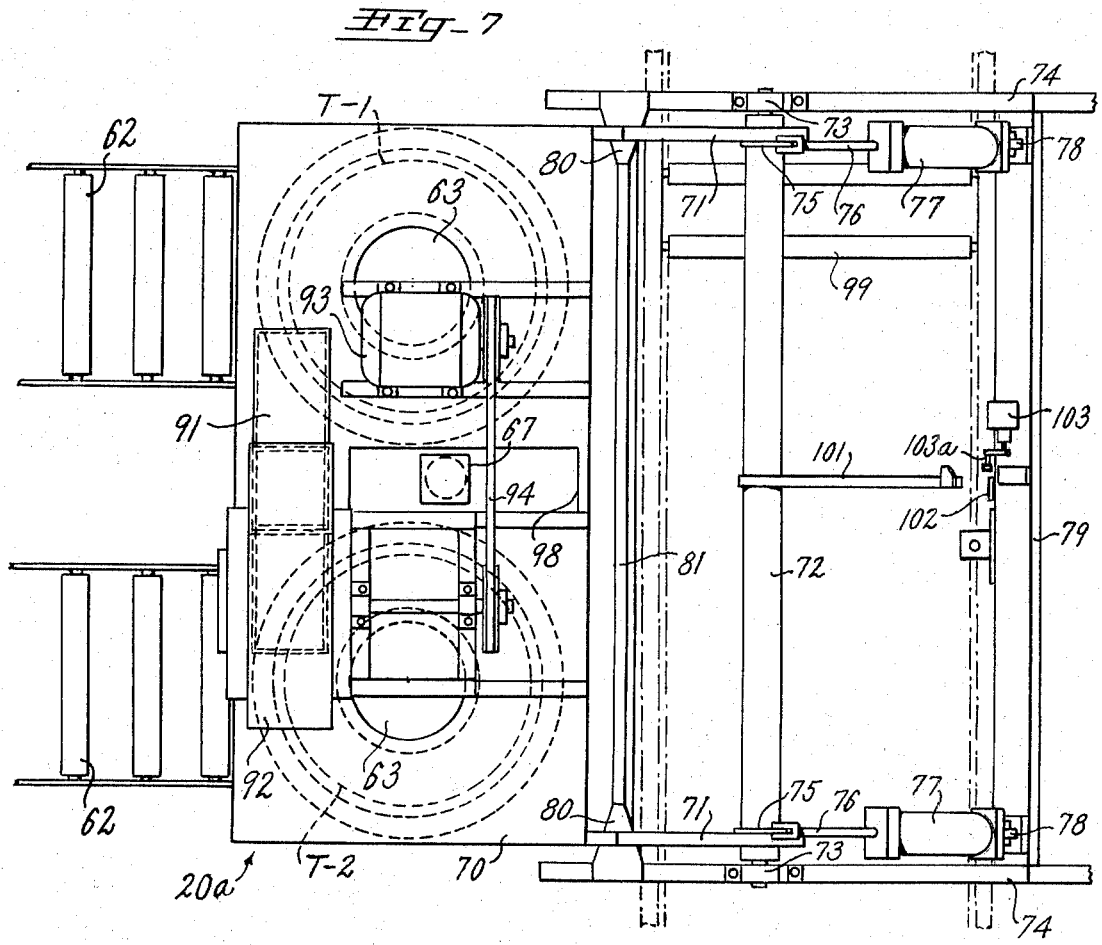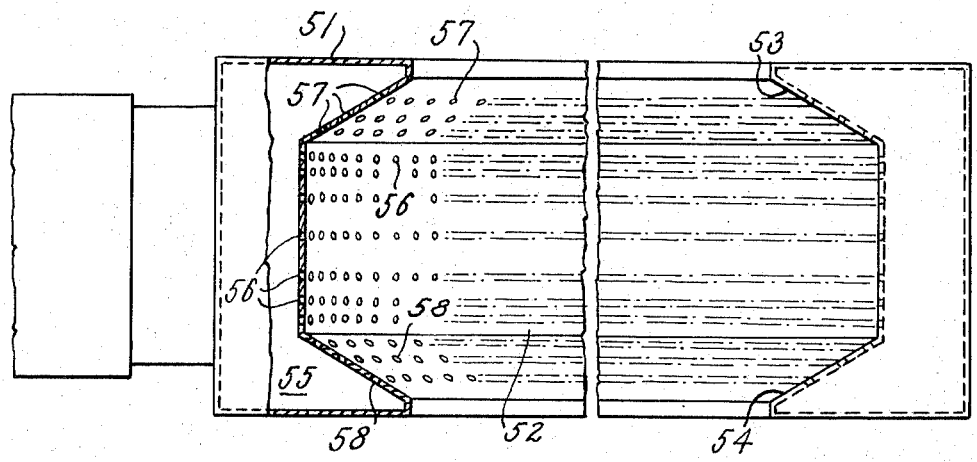

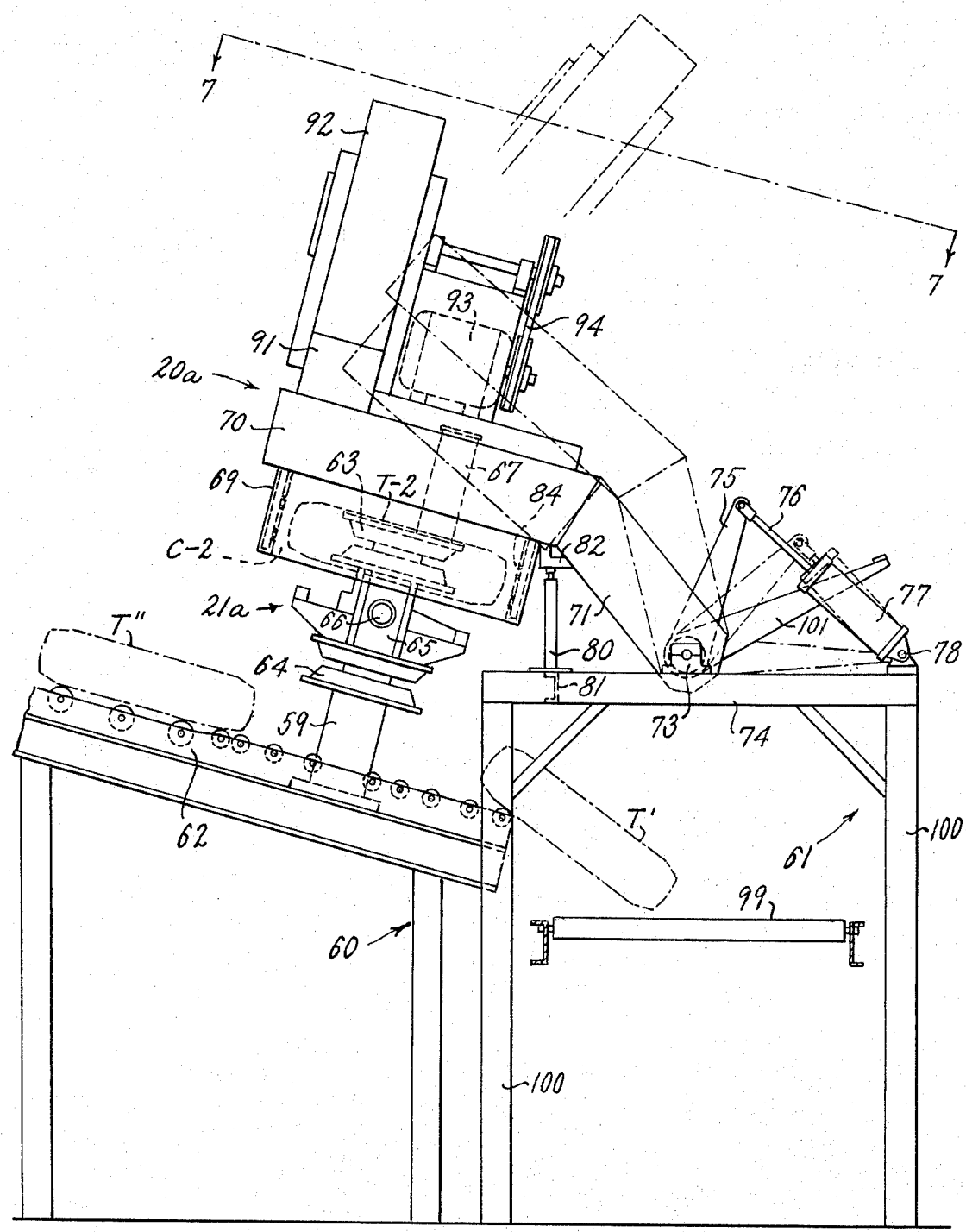

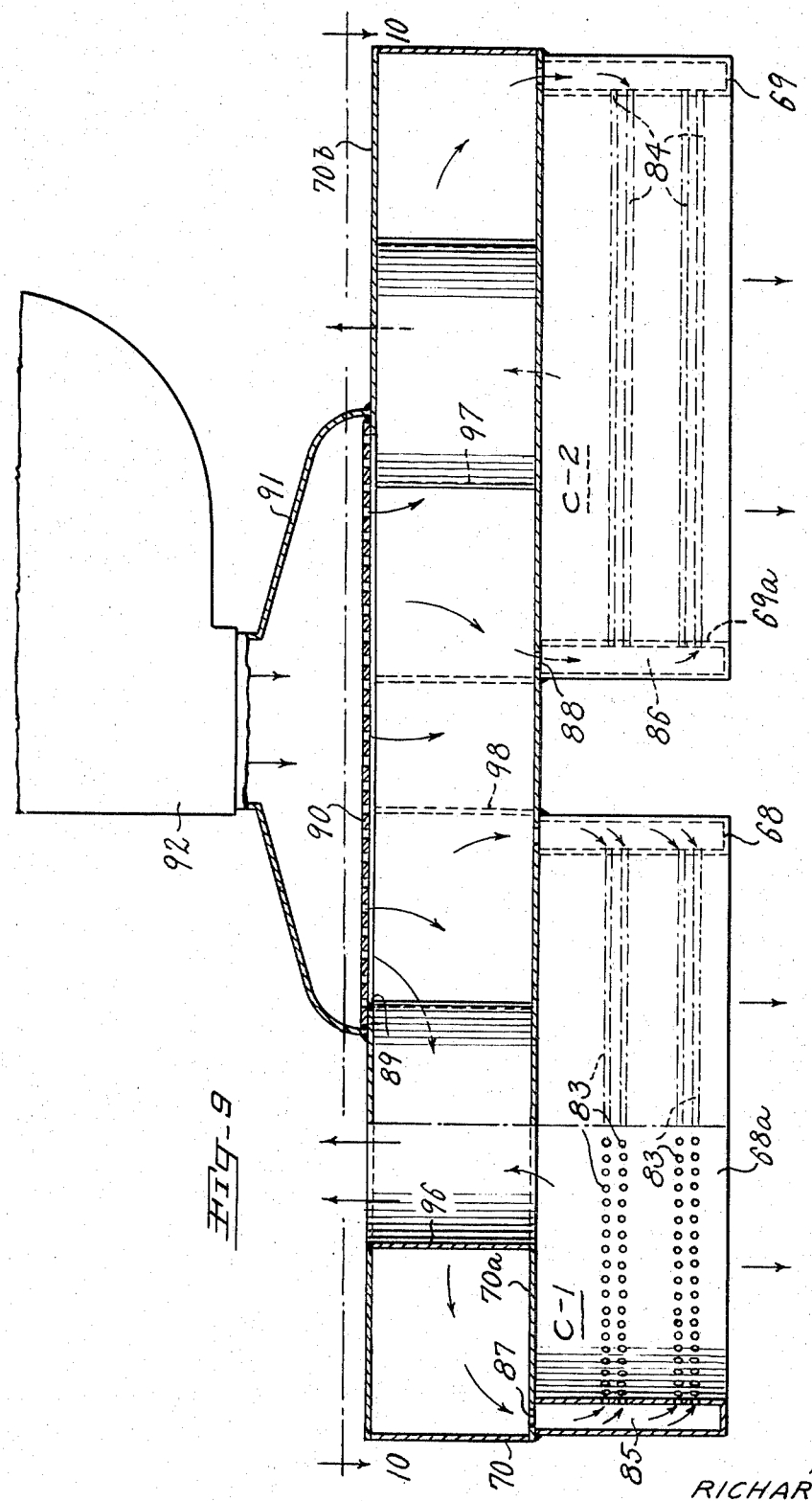

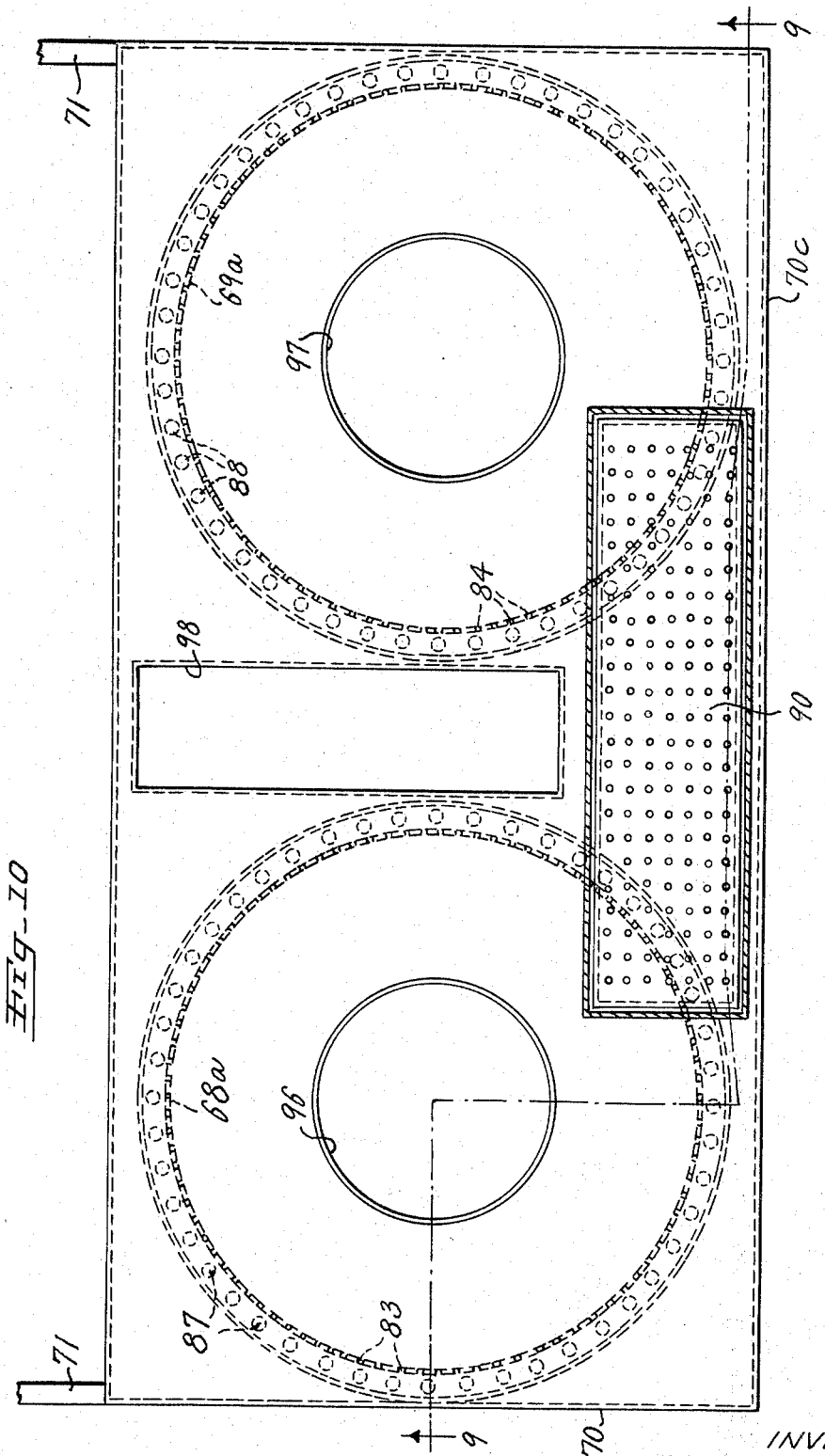

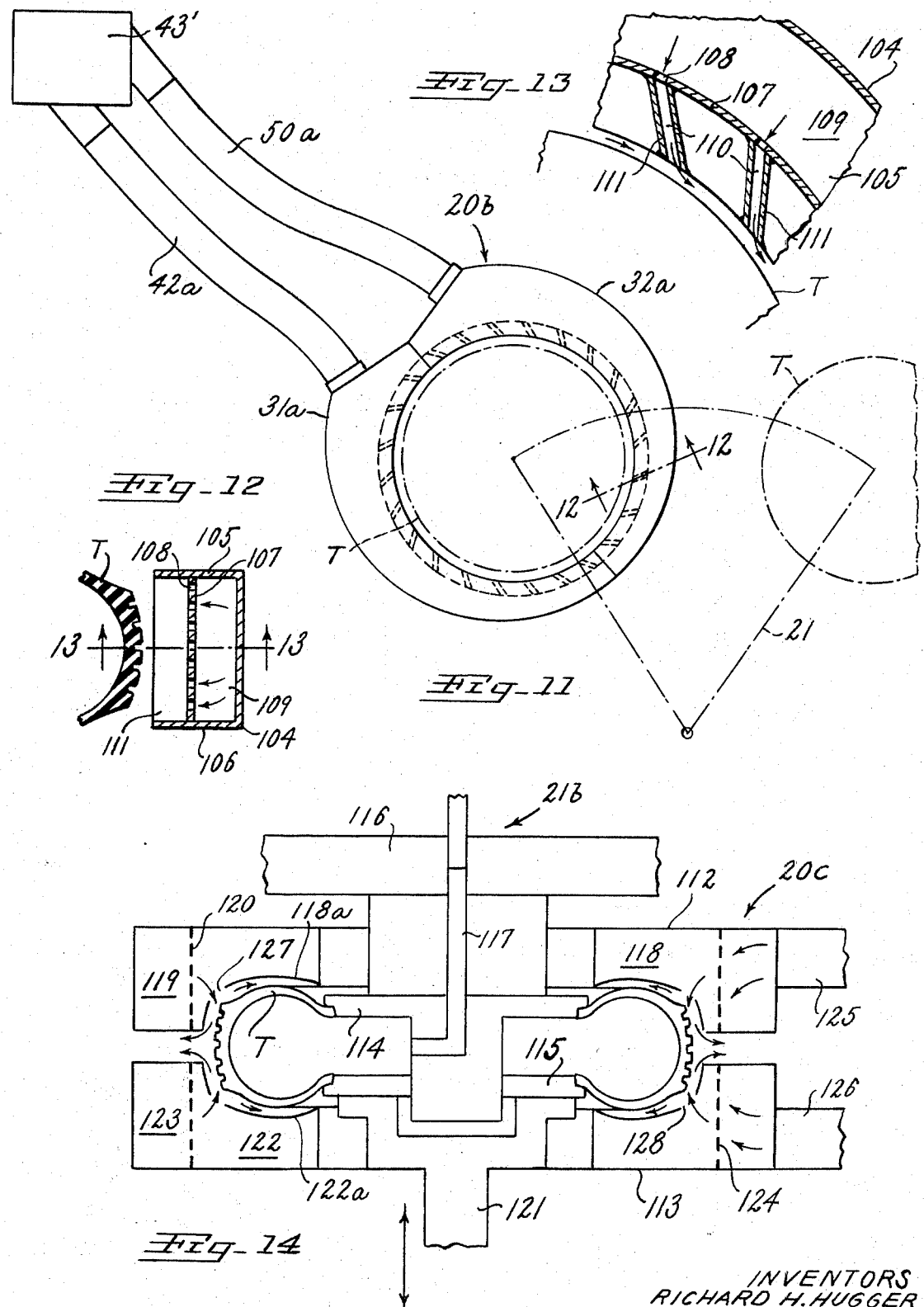

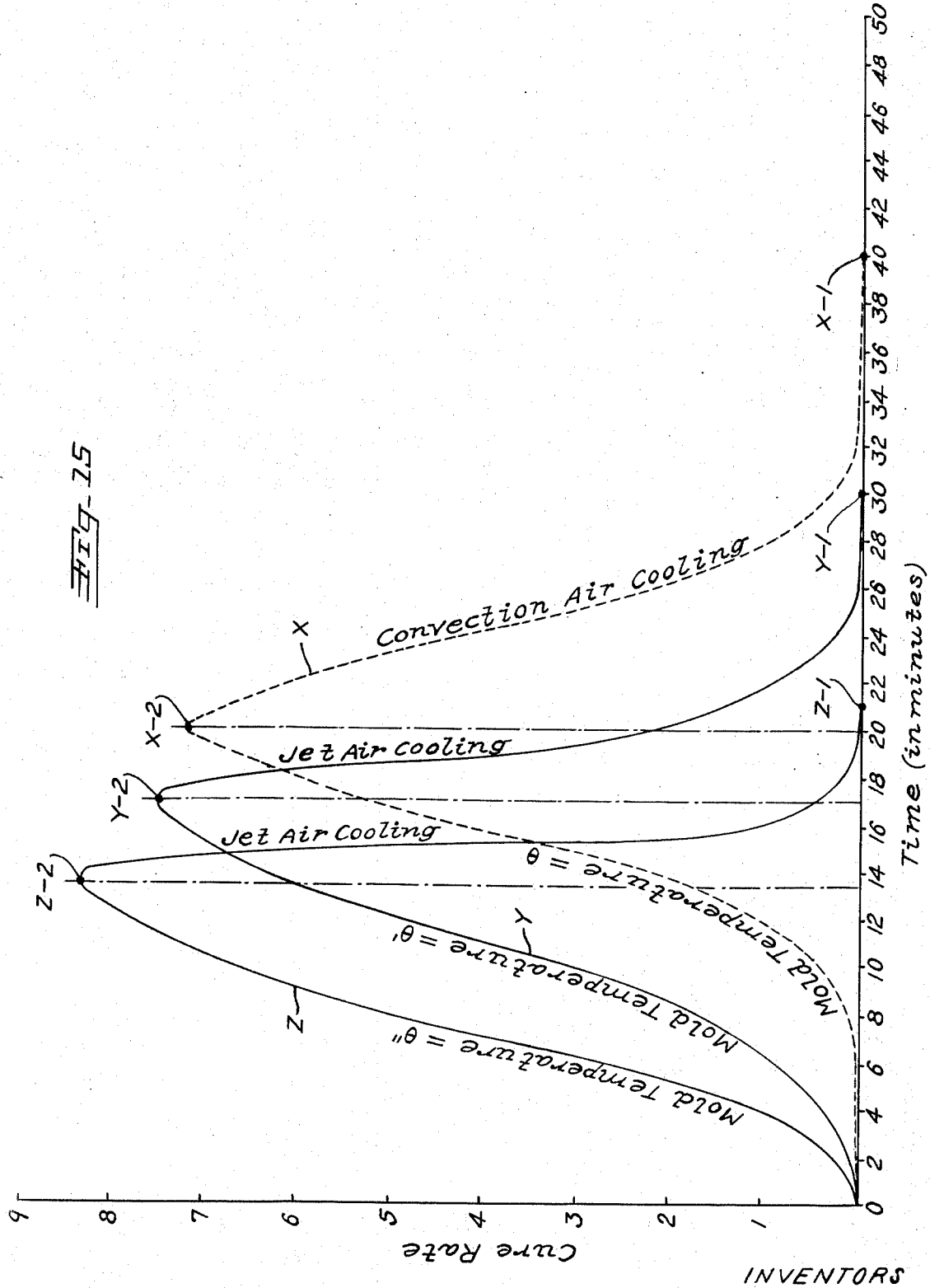

3,792,145
TIRE PRODUCTION WITH JET AIR COOLING DURING POST INFLATION
Richard H. Hugger, Ridgewood, and George C. Huang, Kinnelon, N.J., assignors to Uniroyal, Inc.
Continuation of application Ser. No. 9,112, Feb. 9, 1970, which is a continuation of application Ser. No. 596,114, Nov. 22, 1966, both now abandoned. This application Sept. 14, 1971, Ser. No. 180,491
Int. Cl. B29n 5/02
U.S. Cl. 264—100
12 Claims

ABSTRACT OF THE DISCLOSURE

Improvements in tire manufacture, leading to the production of pneumatic tires characterized by optimized sets of circumferentially substantially uniform thermal, physical and geometrical properties, are disclosed. In the course of the mold cycle in the press, such a tire is heated for a predetermined period of time sufficient to impart to the tire a major portion of the final desired cure state to be achieved during the cure cycle which also includes a post inflation cycle outside the press. During the post inflation cycle, cooling air, preferably air taken from the curing room atmosphere itself, is directed in jet form to be incident initially against the tread region of the tire from the exterior of the latter along the entire circumference thereof, the air thereafter flowing at least in part over the sidewall regions of the tire. The air flow conditions are so selected as to achieve in the vicinity of the initial contact of the cooling air with the tire a tire to air heat transfer coefficient ranging from about 15 to about 70 B.t.u./hr./sq. ft./° F. for effecting a rapid and controlled cooling of the tire, and the duration of the jet air cooling is adjusted to be less than the said heating period in the mold but nevertheless still sufficient, despite the rapid cooling, to enable the remaining minor portion of the desired final cure state to be achieved in the course of the post inflation cycle. This abstract is not to be taken either as a complete exposition or as a limitation of the present invention, however, the full nature and extent of the invention being discernible only by reference to and from the entire disclosure.

---

This invention relates to improvements in the production of pneumatic tires and especially in the molding and the post-cure inflation stages of the manufacture thereof.

The instant application is a continuation of our prior copending application Ser. No. 9,112, filed Feb. 9, 1970 and now abandoned, which in turn was a continuation of our prior application Ser. No. 596,114, filed Nov. 22, 1966 and now abandoned.

For the tire industry, striving to meet quality standards for pneumatic tires which are becoming ever more stringent, the production of tires which are highly resistant to tread groove cracking and are also circumferentially uniformly dimensioned and cured is a matter of vital importance. To this end, pneumatic tires, immediately after being removed from the press or mold and while cooling down from the relatively high curing temperatures utilized in the press, are generally mounted on a suitable air-tight rim or chuck structure and internally inflated by air to a pressure of about 30 to 50 p.s.i. or more, the maximum pressure in any given case basically depending on the size and type of the tire involved. This technique is universally known as "post inflation."

In actual practice, the tires on the post inflation equipment are almost invariably cooled by open air natural convection, resulting from their being exposed to the ambient atmosphere surrounding such equipment. Open air natural convection cooling has been found to be somewhat unsatisfactory, however, since not only is the rate of cooling relatively low due to the low heat transfer coefficient of stagnant or slow moving air, but it is also not uniform over all portions of each tire. This will be readily understood when it is considered that post inflation equipment is always located as near the tire curing presses as possible, whereby during post inflation the different parts of each tire (for example, the respective regions thereof facing toward and away from the press) will be exposed to different ambient temperatures, a condition which may be aggravated even further by such unpredictable factors as drafts in the curing room resulting from opening and closing of windows and doors, existing outside weather conditions, etc.

It is furthermore well known that tires continue to cure even after they have been removed from the press and while they are cooling down. It is then found, however, that a tire subjected to such non-uniform cooling rates is generally circumferentially non-uniformly cured at the locus of any given radial distance from the axis of the tire. A concomitant of this drawback has been the fact that such tires are also found to be characterized by radial dimensions which are circumferentially excessively nonuniform.

The foregoing considerations apply to all tires reinforced by carcasses composed of one or more plies of tire cord fabric, irrespective of the nature of the material of which the tire cords are made, i.e. whether such material develops substantially no or only negligible shrinkage stresses when subjected to high temperatures (such as cotton, rayon, glass fiber, steel wires, and the like) or whether it does develop appreciable shrinkage stresses under high temperatures (such as nylon polyester, and the like). As to all such pneumatic tires, post inflation has provided great advances toward the elimination or minimization of tread groove cracking, in-service growth, and other related defects.

Tires made with standard nylon tire cord carcasses, apparently due to the thermoplastic characteristics of nylon, have nevertheless remained beset by the problem of "flat spotting," i.e. the tendency of such tires to develop flat spots when vehicles on which they are mounted are left standing for considerable periods of time. Since post inflation has not led to the elimination of this defect, attempts have been made to overcome the problem by the development and use of new tire cord materials. Merely by way of example, one such new material, a novel form of nylon recently developed by E. I. du Pont de Nemours & Co. and known generally as "nylon-44" or "N-44" nylon, gives promise that tires reinforced by carcasses made of this fiber may no longer be as seriously troubled by flat spotting, but tests have shown that nylon-44 carcass tires must be reduced to temperatures on the order of 140–160° F. or less at the tread-carcass interface in order to reduce the cord shrinkage forces to an acceptable level and permit the post inflation operation to be terminated. In this connection, however, tests have also shown that generally in any batch of tires, regardless of the nature of the carcass, there will be a better yield of acceptable tires, i.e. tires not deviating more than a certain amount form preselected standards, when these tires are cooled to such relatively low temperatures while undergoing post inflation.

Although in theory the effectuation of such a temperature reduction offers no difficulties, in a practical tire manufacturing operation the need to wait for such a large temperature drop to take place is a disastrous disadvantage, due to the fact that under the standard open air convection cooling procedures, a tire must remain on the post inflation stand for a period of time roughly equivalent to from two to three or more full mold cycles to reach a temperature of about 160° F. In modern tire curing rooms, each press is generally associated with its own post inflation equipment, a dual unit press of any of the major types used by almost the entire industry thus requiring post inflation equipment able to accommodate the two tires cured during each operating or mold cycle of the press.

For standard dual (two-chuck) post inflation equipment, therefore, it is an absolute necessity for the tire to cool to the desired temperature in a period of time, i.e., a post inflation cycle, which is at most equal to and preferably somewhat shorter than a single mold cycle, so that the cooled tires can be removed from the post inflation equipment before the newly cured tires arrive there after being removed from the press. On the other hand, in certain types of recently developed quadruple post inflation equipment provided with two pairs of chucks able to accommodate four tires at a time, each pair of tires removed from the press can be permitted to stay on its pair of post inflation chucks for a period of time slightly less than two mold cycles in the press.

To the best of our knowledge, no post inflation equipment is presently in use which is capable of accepting three or more pairs of tires at a time so as to permit each tire to remain subjected to post inflation for a correspondingly greater number of mold cycles. In fact, space available in tire factories at the present time is already so limited that the use of such equipment (which would, of necessity, be extermely bulky) or even the provision of extra sets of the currently available types of post inflation equipment is a practical impossibility.

Various proposals have heretofore been made to accelerate the cooling of tires on post inflation equipment, i.e. to shorten the post inflation cycle, by subjecting such tires to the action of a moving cooling fluid. Representative of one class of these proposals are the techniques and equipment disclosed in Soderquist U.S. Pat. No. 2,963,737, Woodhall U.S. Pat. No. 3,008,180 and Brundage et al. U.S. Pat. No. 3,065,499, all of which contemplate spraying water over each tire on the post inflation stand. While in theory the heat absorption capacity of water is sufficient to ensure that any tire subjected to a cold water spray would be cooled sufficiently within a period of time somewhat less than one full mold cycle, this method has not found any substantial acceptance in the tire industry principally for reasons of space and economy essentially similar to those which have militated against the simple expedient of increasing the quantity of available post inflation equipment, viz. the problem of where to put the required bulky pumping mechanisms, liquid-handling (supply and drainage) ducts, and related equipment for extracting from used water the heat imparted thereto by the tires being cooled, and the high cost of such systems. Water is also quite messy, and its use creates intolerable working conditions in the curing or press room.

On the other hand, it has also been proposed in Waters et al. U.S. Pat. No. 3,039,839 to subject a cured tire on a post inflation stand to the action of a stream of room temperature air which would be blown against the tire by means of fans or with the aid of nozzles connected with a source of air under pressure. This approach too has not proved generally successful, even in the special case (to which that patent is primarily addressed) of tires reinforced by standard nylon-66 tire cord carcasses, in that it provides no assurance that a non-uniform cooling of different portions of the tire, as previously explained, can be avoided. In the case of tires reinforced by nylon-44 cord carcasses, this drawback is supplemented by the fact that the rate of heat transfer attainable by the Waters et al. procedure is too low as well.

It is an important object of the present invention, therefore, to provide means enabling the problems and disadvantages heretofore encountered in the known methods of cooling pneumatic tires during post inflation to be substantially eliminated.

It is also an object of the present invention to provide means rendering the production of pneumatic tires more economical by enabling the respective full cure cycles of such tires, each consisting of a mold cycle and an immediately subsequent post inflation cycle, to be considerably shortened through a shortening of both parts of each cure cycle in such a manner that a major proportion of the desired cure state of the tire is achieved in the mold cycle and the remaining minor proportion in the post inflation or cooling cycle.

Yet another object of the present invention is the provision of novel processes of and apparatus for rapidly and in a precisely controlled uniform manner cooling tires made with carcasses of either heat-shrinkable or non-heat-shrinkable fiber tire cord materials during post inflation of such tires.

Generally speaking, these aims of the present invention are achieved by virtue of the fact that during the mold cycle we heat each tire for a predetermined period of time which is less than the duration of a mold cycle required for effecting a full cure of that type of tire, thereby to impart to the tire during the so-shortened mold cycle a major proportion of the desired final cure state to be attained in the entire cure cycle, whereupon during the immediately subsequent post inflation cycle we direct jet-like streams of cooling air, in predetermined flow patterns and at predetermined elevated volume flow rates sufficient to deliver a relatively high heat transfer coefficient on the order of from about 15 to 70 B.t.u./hr./sq. ft./° F., to be initially incident against selected regions of the tire, preferably the tread and shoulder regions which are normally the thickest and have the greatest heat-retaining capacity, and to flow thence at least in part over the thinner regions, i.e. the sidewalls, in a manner so controlled as to enable the remaining portion of the desired final cure state to be achieved at all parts of the tire during the post inflation cycle, as will be more fully explained hereinafter. The term "heat transfer coefficient" as used herein will be more explicitly defined presently.

The cooling air may be taken directly from the curing room atmosphere or, alternatively, may be taken from the outside of the building, and it may be either at the ambient temperature, generally between about 70 and 120° F. in the curing room and possibly somewhat lower outside, or it may be preliminarily cooled or refrigerated to any desired lower temperature. The volume flow rate of the air may range from about 500 to 1,000 cubic feet per minute in the case of most passenger tires, but if necessary, for example in the case of larger tires, correspondingly higher volume flow rates, ranging up to as much as 5,000 cubic feet per minute or more, may be employed. The tire when thus treated is cooled from its curing temperature to a temperature in the range of 140–160° F. at the tread-carcass interface in the shortest possible time and specifically in less than one full mold cycle.

With respect to nylon-44, actual tests have shown that treated, twisted and solutioned 1260/2 cords of this material having an average pre-heat tension of about 0.070 to 0.10 lb. develop a shrinkage tension at constant length of about 1.55 lbs./cord when heated to a temperature of about 350° F., which is reduced to about 0.3 lb./cord upon cooling to 160° F., and to about 0.2 lb./cord upon cooling to 150° F. The beneficial effect which a major total cord stress reduction can bring about thus will be readily understood when it is considered that there are generally about 20 cord ends per inch width in each fabric ply of the carcass. The controlled jet air cooling method of the present invention not only achieves this result in an extremely short period of time, as previously stated, but also in such a manner that both the stress reduction and the final cure state and dimensional stability are as uniform as possible throughout the circumference of the tire being cooled.

The foregoing and other objects, characteristics and advantages of the present invention will be more fully understood from the following detailed description thereof when read in conjunction with the accompanying drawings, in which:

FIG. 1 is a fragmentary side elevational view of a jet air cooling apparatus constructed in accordance with one aspect of the basic principles of the present invention and adapted for use in conjunction with one type of post inflation equipment;

FIG. 2 is a fragmentary plan view of a part of the cooling apparatus shown in FIG. 1, the view being taken along the line 2—2 in FIG. 1;

FIG. 3 is a fragmentary side elevational view, partly in section, of the jet air cooling apparatus and post inflation equipment shown in FIG. 1 when activated for a tire-cooling operation;

FIG. 4 is a sectional view taken along the line 4—4 in FIG. 3;

FIG. 5 is a fragmentary, partly sectional, plan view, similar to FIG. 2, of a part of a jet air cooling apparatus having a somewhat modified construction according to the present invention;

FIG. 6 is a side elevational view of another form of jet air cooling apparatus constructed to implement the process aspects of the present invention and adapted for use in conjunction with a different type of post inflation equipment;

FIG. 7 is a fragmentary plan view of the structure shown in FIG. 6, the view being taken along the line 7—7 of FIG. 6;

FIG. 9 is a fragmentary vertical section, partly in elevation, through the air distributing means of the jet air cooling apparatus shown in FIG. 6, the view being taken along the line 9—9 in FIG. 10;

FIG. 10 is a sectional view taken along the line 10—10 in FIG. 9;

FIG. 11 is a diagrammatic illustration, similar to FIG. 3, of another method of and apparatus for cooling tires during post inflation in accordance with the present invention;

FIG. 12 is a fragmentary sectional view taken along the line 12—12 in FIG. 11;

FIG. 13 is a fragmentary sectional view taken along the line 13—13 in FIG. 12;

FIG. 14 is a diagrammatic illustration of yet a further method of and apparatus for cooling post-inflated tires in accordance with the present invention; and FIG. 15 is a graphic representation of the advantageous results achieved by the implementation of the tire production improvements of the present invention.

Figure 8:
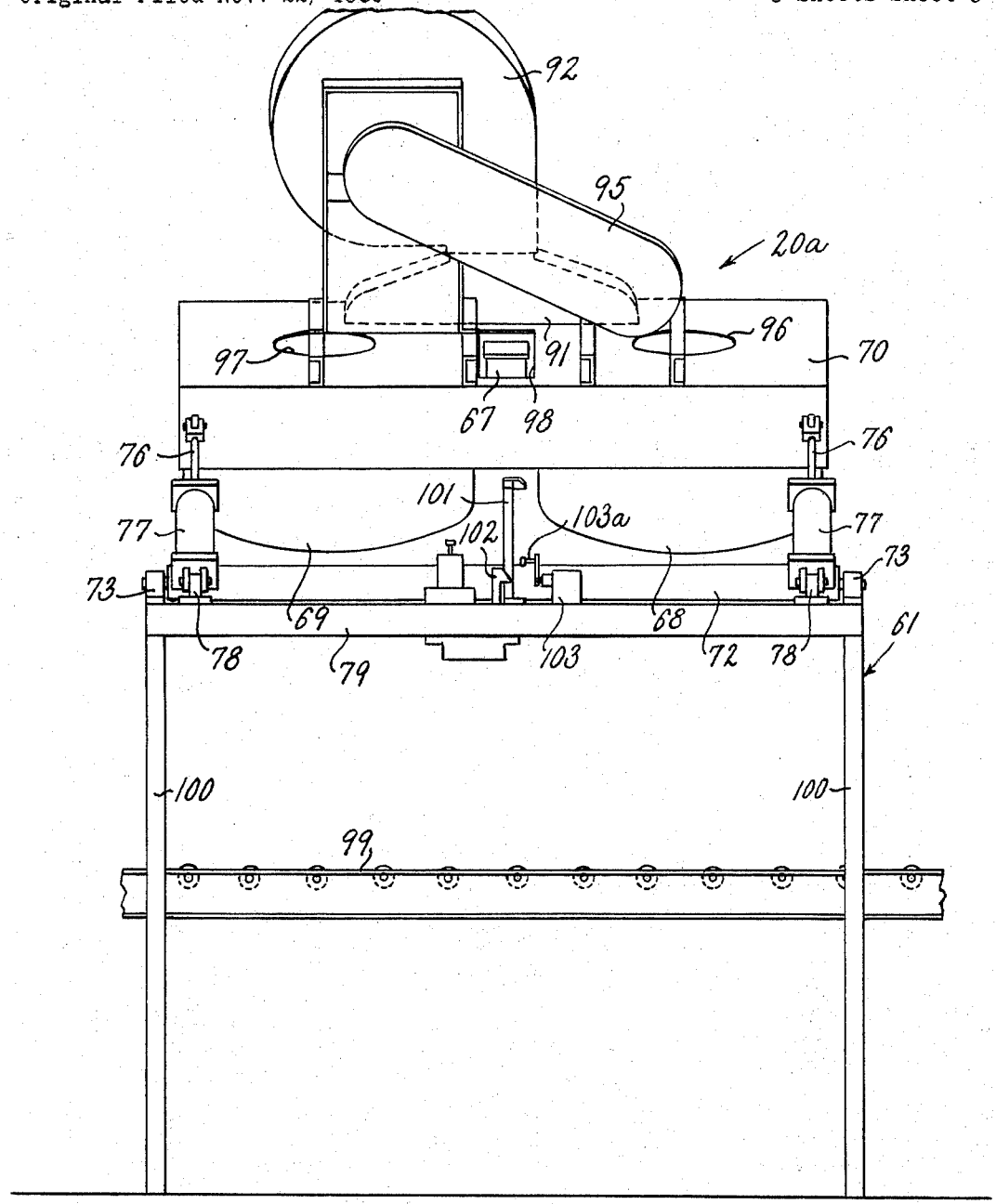
FIG. 8 is a fragmentary rear elevational view of the structure shown in FIG. 6.

Referring now first to FIGS. 1 to 4, the jet air cooling apparatus 20 according to our invention there shown is designed for use in conjunction with post inflation equipment 21 of the type in which the tire-receiving chuck or rim structure 22 is supported at one end of an arm 23 the other end of which is connected at 23a to a support 24 for pivotal swinging movement in a vertical plane. The arm 23 is provided with a longitudinal duct 25 establishing communication between a bore 22a (FIG. 4) in the chuck 22 and a hose 26 to enable air under pressure to be admitted into a tire T, when the latter is mounted on the chuck, so as to inflate the tire. Intermediate its ends, the arm 23 is articulated at 27 to the free end of a piston rod 28 of a suitable double-acting fluid pressure cylinder 29 the blind end of which is pivotally connected at 29a to a support 30. In this manner, the post inflation equipment 21 may be moved reciprocally between the positions thereof illustrated in FIGS. 1 and 3.

The jet air cooling apparatus 20 designed, according to this aspect of the present invention, to be used with the post inflation equipment 21, comprises a pair of cooling chamber-defining members 31 and 32. These members are substantially identical in construction and are arranged in mirror image relation to one another, being provided at their facing sides with semi-cylindrical recesses C' and C" (FIG. 1) which, when the members 31 and 32 are in closed end to end juxtaposition (FIG. 3), define a cylindrical chamber C to accommodate the tire T being cooled. Merely by way of example, the member 31 is stationarily supported in any suitable manner (not shown) by framework 33, while the member 32 is movably supported by the framework 33 through the intermediary of a link 34 pivotally connected at 34a to the member 32 and at 34b to a bracket 33a of the framework 33. A cable 35 is connected to the member 32 to enable the latter to be raised away from or lowered toward the member 31.

As clearly shown in FIGS. 1 to 4, the curved boundary of the recess or chamber section C' of member 31 is defined by a semi-cylindrical wall 36 which also constitutes the curved boundary of an essentially U-shaped plenum chamber 37 the opposite boundary of which is constituted by a transverse flat wall 38. In the illustrated form of the invention, the wall 36 is shown as being provided with two pairs of parallel rows of small orifices 39 extending from one end of the wall 36 to the other, and the wall 38 is provided throughout its entire expanse with a plurality of openings 40 (FIGS. 3 and 4) preferably arranged in staggered parallel rows.

The member 31 is further provided with a chamber 41 coextensive with the wall 38. The chamber 41, which is shown as being essentially wedge-shaped, communicates through a duct 42 with one branch 43a of the discharge side of a suitable blower 43 mounted on a bracket 33b of the framework 33. The intake side of the blower 43 is arranged to draw air from any suitable source, preferably the atmosphere in the tire curing room in which the apparatus 20 is located. The arrangement thus is such that air entering the chamber 41 from the duct 42 is distributed over the wall 38 so as to reach a uniform static pressure by virtue of the physical parameters of the chamber 41 and thence enters the plenum chamber 37 in a uniform manner, from which it passes at likewise uniform volume flow rates through the openings 39 into the recess C'.

In identical fashion, the recess C" of the member 32 is bounded by a semi-cylindrically curved wall 44 which is provided with four rows of orifices 45 and also constitutes the curved boundary of a U-shaped plenum chamber 46 the opposite boundary of which is defined by a flat wall 47 provided with a plurality of openings 48 over its entire expanse. Through the openings 48, the chamber 46 communicates with a wedge-shaped chamber 49 which in turn communicates with a flexible duct 50 connected to a second branch 43b of the discharge side of the blower 43. It will be apparent from FIG. 4 that the respective sets of orifices 39 and 45 are so arranged that when the members 31 and 32 are closed to define the cooling chamber C (FIG. 3), the orifices are disposed in four continuous rows extending circumferentially about the chamber C at transversely spaced locations. Preferably, the spacing of the pairs of rows of orifices corresponds to the average distance between the shoulder regions of the tires in the range of nominal sizes to be treated in the apparatus 20.

In operation, as soon as a tire T is removed from the press (not shown), mounted on the chuck or rim 22 of the post inflation stand 21 and inflated with air to a suitable interal pressure via the conduits 26–25–23a, the cylinder 29 is actuated to retract the piston rod 28, thereby to swing the arm 23 from its position shown in FIG. 1 to its position shown in FIG. 3, until one-half of the tire is disposed within the confines of the semicircular recess C' defined by the wall 36 of the member 31. The member 32 is now lowered through the cable 35 into the position shown in FIG. 3, so that the tire T is fully confined within the cooling zone defined by the cylindrical chamber C. With the blower 43 working, the cooling air, which in the illustrated preferred case is at the curing room temperature, normally on the order of about 100 to 110° F. (although it may be somewhat higher or lower), enters the chambers 41 and 49 and thence, due to the shape of these chambers and the provision of the perforated distribution walls 38 and 47, enters the respective plenum chambers 37 and 46, i.e. the distribution zone defined by these chambers, at a uniform static pressure. From the chambers 37 and 46, this air flows uniformly at a relatively high volume flow rate through the orifices 39 and 45 (see FIG. 4) against the tread of the tire T, playing principally against the shoulder regions of the tire (which are usually the thickest and thus the most heat-retentive) and thence in part over the crown center region and in part over the sidewalls of the tire, the spent air leaving the cooling chamber via the open sides thereof. It will be understood that both the volume rate of flow and the velocity of flow of the cooling air will inherently be less in the thinner regions of the tire, i.e. the sidewalls, than in the thicker regions of the tire, i.e. the tread and shoulders. Equally inherently, the heat absorption by the air will be less at the sidewalls than at the tread and shoulders, by virtue of the fact that the temperature difference between the tire surface and the air is less at the sidewalls than at the tread, since the air, having already passed over the thicker sections of the tire by the time it reaches the thinner ones, is somewhat hotter than it was initially. The significance of these factors and the details of the operating conditions employed to ensure that this arrangement enables the tire T to be cooled from the curing temperature to a temperature of about 140–160° F. at the tread-carcass interface in a period of time which is shorter than the duration of a normal full cure mold cycle for that type of tire will be more fully explained hereinafter in conjunction with the description of the process aspects of the present invention.

As previously indicated, although the use of the air in the curing room is preferred, it would be possible to use air piped in from the outside or from a suitable precooling or refrigerating device. A central air distribution system may be utilized as the air source, if desired. In any event, the base requirement is that the air temperature be lower than the temperature to which the tire is to be cooled. For reasons which will presently become clear, the time of exposure of the tire to the cooling air flow may have to be adjusted in dependence on the air temperature.

In accordance with another aspect of the present invention (see FIG. 5), the jet air cooling apparatus 20 may be modified somewhat through the use of a pair of cooling chamber-defining members 51 (only one is shown) in lieu of the members 31 and 32 shown in FIGS. 1 to 4. Each such member 51 differs from either of the members 31 and 32 in that the semi-cylindrical wall 52 (which corresponds to the walls 36 and 44) is provided at its opposite sides with a pair of generally radially inwardly and axially outwardly extending wall portions 53 and 54. The cooling chamber section defined by the member 51 thus is somewhat trough-shaped (rather than semi-cylindrical as are the chamber sections C' and C''). An internal plenum chamber 55 in the member 51 is bounded at the front by the wall 52–53–54, and, like the chambers 37 and 46, is bounded at the rear by a distribution wall (not shown) perforated over its entire expanse, behind which there is provided a pressure-equalizing chamber (like the chambers 41 and 49) into which the cooling air may be fed via a conduit such as 42 or 50.

The wall portions 52, 53 and 54 in the illustrated form are all provided with respective sets of parallel rows of orifices 56, 57 and 58 establishing communication between the plenum chamber 55 and the cooling chamber section bounded by the wall 52–53–54. In FIG. 5, each of the wall portions 53 and 54 is shown as being provided with three rows of such orifices, while the wall portion 52 is shown as being provided with seven such rows, i.e. two pairs of rows juxtaposed to the general locations of the shoulders of a tire to be cooled, one central row juxtaposed to the crown center of such tire, and two rows each intermediate the central row and a respective one of the pairs of "shoulder" rows. It will be understood, of course, that the number of such rows of orifices in any of the wall portions 52, 53 and 54 of the member 51 may be varied, even to the point of complete elimination of one or more rows, as desired or found necessary. In practice, therefore, the cooling chamber defined by two members 51 when the same are in the closed position will be provided with circular rows of orifices arranged to direct cooling air not only against the tread of a tire received in said cooling chamber, but also against portions of the sidewalls of the tire, which may be advantageous, for example, in the case of relatively large size tires having considerable masses of usually highly heat-retaining rubber extending from the tread and shoulder regions radially inwardly along the sidewalls.

As will be readily understood, the post inflation equipment 21 may include two chucks 22 substantially identically arranged to cooperate with a dual cavity press, and the jet air cooling apparatus correspondingly may include two cooling chamber arrangements 31–32 or 51.

Although the jet air cooling apparatus so far described is of relatively simple construction, it is believed that it does fully bring forth not only the basic principles underlying the cooling aspects of the present invention but also the structural and operational features, parameters and relationships which will characterize any apparatus designed for this purpose. Thus, one of the foundations of our invention is the recognition that even unrefrigerated air at the temperatures normally reigning in tire curing rooms, generally between about 70 and 120° F., will, if caused to flow under appropriate conditions as more fully described hereinafter, deliver a heat transfer coefficient which is sufficiently high to enable the required high heat transfer rate from a tire under post inflation to be achieved with a degree of efficiency closely approximating that of a cold water spray and many times that of ordinary convection air cooling. The term "heat transfer coefficient" expressed in B.t.u./hr./sq. ft./° F. (where the last two terms refer, respectively, to the surface area of the tire being cooled and the difference in temperature between the surface and the cooling air) is here used to describe the effectiveness of the entire system the parameters of which include the temperature, velocity and direction of the air flow as well as the volume or mass rate of air flow, which in turn are functions of such parameters as orifice design and size, percentage of open areas, the cooling chamber size, and the gap between the orifices and the tire surfaces. Axiomatically, of course, the higher the volume rate of flow and the velocity of flow, the higher is the heat transfer coefficient. Concomitantly, another foundation of our invention is the recognition that the potential value of even such an air flow in effecting a uniform rapid cooling of a tire under post inflation, to the end of imparting thereto circumferentially uniform cure states, cord stress conditions and dimensional stability, will be lost if the direction, localization and distribution of the air flow are not accurately defined.

On the basis of these considerations, we have determined that a jet air cooling process according to our invention and an apparatus for practicing this process preferably should have the following characteristics:

(1) The air blower (i.e. 43 or its equivalent), which may be driven by a 1 to 6 horsepower motor, should deliver the cooling air in the desired temperature range at a static pressure of up to about 7 inches of water.

(2) The air distribution plate (i.e. 38 or 47 or the equivalent thereof) may be about ⅛ inch and at most about ½ inch thick and perforated with holes between about ¼ and ¾ inch in diameter, spaced about ⅜ inch apart, and providing between about 10 to 50% open area, and its design in cooperation with the design of the pressure equalizing region (i.e. chamber 41 or 49 or the equivalent thereof) should be such as to develop a uniform static air pressure in the distribution zone (chamber 37 or 46 or the equivalent thereof) between about 1½ and 5½ inches of water. It will be understood that the plate thickness is not a critical parameter and need only be sufficient to provide the strength required for fabrication and to resist the fluid forces due to the air flow.

(3) The cooling chamber boundary or air jet locus (i.e. wall 36–44 or the equivalent thereof) should be at most about ⅜ inch thick and perforated with holes between about ⅛ and ⅜ inch in diameter providing between about 1¼ and 15% open area and enabling delivery, at a static pressure between about 1 and 4 inches of water, of a heat transfer coefficient between about 15 and 70 B.t.u./hr./sq. ft./° F., which we have determined requires a volume flow rate of between about 500 and 5,000 or more cubic feet per minute, and the diameter of the chamber should be such as to locate the air jets (i.e. the holes or openings 39–45 or equivalents thereof) between about ½ and 5 inches from the tire surface, thereby to enable each given chamber to be used in cooling tires of a range of sizes. It should be understood that the orifices may be in the form of round holes as stated or in the form of slots, nozzles, etc.

(4) The jet air cooling apparatus should be adapted to the particular types of post inflation equipment available. Thus, it may be designed in either sectional or unitary form for cooling tires oriented either in a substantially vertical plane or in a substantially horizontal plane or in an inclined plane, it may be arranged for rectilinear or arcuate movement axially or radially relative to the tires, or it may be stationary for cooperation with movable post inflation equipment, etc., or both may be movable.

As an example of the operation of the cooling process of our invention, in actual production runs utilizing a 4-row ¼-inch orifice arrangement apparatus of the type shown in FIGS. 1 to 4, with adjacent orifices at ¾ inch center to center spacings and the outside rows 5 inches apart, we have found that in the case of a 7.00 x 13/2 nylon tire cured in a "Bag-O-Matic" press with a 215 lb. steam cure, an external mold temperature of 324° F. and a total mold cycle of 13.5 minutes, jet air cooling during the post inflation cycle, with a pressure of 3 inches of water at the cooling chamber and a delivered volume flow rate of 723 cubic feet per minuter of air at 110° F., reduced the tread-carcass interface temperature to 160° F. at the crown center of the tire in about 9 minutes and at the relatively thicker shoulders in about 12.2 minutes. In the case of an 8.25 x 14/2 nylon tire cured under identical conditions with a 16.4 minutes mold cycle, the same jet air cooling during post inflation reduced the tread-carcass interface temperature to 160° F. at the crown center in about 10.3 minutes and at the shoulders in about 14.3 minutes.

Merely by way of illustration of the jet air cooling of tires by the process of our invention on other types of post inflation equipment, in the copending application of R. H. Hugger and R. J. Brown, Ser. No. 140,602, filed May 5, 1971, which is a continuation of application Ser. No. 822,746, filed May 7, 1969 and now abandoned, and which in turn was a continuation of application Ser. No. 596,122, filed Nov. 22, 1966 and now bandoned, all of which applications are assigned to the same assignee as the instant application, there are disclosed other forms of apparatus adapted for the practice of the jet air cooling aspects of the present invention. Thus, one such apparatus, shown in FIGS. 6 to 10 of the instant application and designated by the reference numeral 20a, is designed for use in conjunction with quadruple post inflation equipment 21a (FIG. 6) provided with two dual chuck arrangements.

The post inflation equipment 21a per se, which is described and illustrated herein only to the extent of the basic elements thereof with which the jet air cooling apparatus 20a cooperates, in essence includes a column or stand 59 supported by a framework 60 located between the press (not shown) and a framework 61 which supports the apparatus 20a in a manner to be more fully described presently. The stand 59 is arranged midway between two roll conveyors 62, also supported by the framework 60, on which the hot tires taken out of the mold are delivered to the post inflation equipment. Two pairs of radially spaced chucks 63 and 64 are supported in parallel relation by a fulcrum member 65 which in turn is supported by the stand 59 for rotation about a horizontal axis 66. Also secured to and extending upwardly from the stand 59 is a double-acting pneumatic cylinder 67 which is a part of the chuck-operating mechanism of the post inflation equipment 21a. As to the operation of the latter, it is deemed sufficient to point out that by suitable means, such as a rack and pinion combination (not shown), the fulcrum member 65 can be reciprocally pivoted about the axis 66 so as to dispose either the pair of chucks 63 or the pair of chucks 64 in the upper position.

The jet air cooling apparatus 20a provides two cylindrical cooling chambers C–1 and C–2 (FIGS. 6 and 9) each adapted to receive a respective chuck 63 or 64 (and tire supported thereby) when the pair of such chucks is in the upper position. The chambers C–1 and C–2 are defined within a pair of hollow cylindrical walls 68 and 69 extending downwardly from the bottom of a hollow box structure 70 which is provided with a pair of rearwardly extending arms 71 (FIGS. 6, 7 and 10) fixed at their outer ends to a cross-shaft 72 journaled in bearings 73 atop horizontal side members 74 of the framework 61. Also fixedly connected with the cross-shaft 72 are two arms 75 which are articulated to the free ends of respective piston rods 76 extending from a pair of double-acting fluid pressure cylinders 77 pivotally mounted at 78 on the rear cross-member 79 of the framework 61. Thus, upon actuation of the cylinders 77 to retract the piston rods 76, the box 70 with all parts carried thereby is raised into the broken-line position thereof shown in FIG. 6, while upon actuation of the cylinders 77 to protract the piston rods 76, the box 70 is lowered into its solid-line position shown in FIG. 6, the rest position in this case being defined by a pair of adjustable jacks or like abutments 80 mounted on the front member 81 of the framework 61 beneath a pair of brackets 82 carried by the arms 71.

Reverting now to the cooling structure of the apparatus 20a, the inner members 68a and 69a of the cooling chamber-defining walls 68 and 69 are provided with respective sets of rows of orifices 83 and 84 corresponding, for example, in size and arrangement to the orifices 39 and 45 of the apparatus 20 shown in FIGS. 1 to 4. The orifices 83 and 84 establish communication between the chambers C–1 and C–2 and the annular interior plenum chambers 85 and 86 of the walls 68 and 69. The plenum chambers 85 and 86 communicate with the interior of the box 70 through respective sets of circularly arranged openings 87 and 88 provided in the bottom wall 70a (FIG. 9) of the box. In the top wall 70b of the box just rearwardly of the front wall 70c thereof is provided a rectangular opening 89 extending laterally and covered by a perforated plate 90. Mounted atop the box 70 over the perforated distribution plate 90 is an inverted funnel-shaped duct 91 which at its narrower upper end is connected to the discharge side of a blower 92 the intake side of which is adapted to draw air from any suitable source as previously explained, e.g. the ambient curing room atmosphere. The blower is mounted in any suitable manner atop the box 70 and is arranged to be driven by means of an electric motor 93 (omitted from FIG. 8 for the sake of clarity) through the intermediary of a drive belt 94 or other appropriate transmission means. As indicated diagrammatically only in FIG. 8, a safety housing or cover 95 may be provided for the drive belt.

Referring further to FIGS. 9 and 10 in particular, the box 70 is traversed from top to bottom by a pair of cylindrical ducts 96 and 97 which are disposed essentially concentrically with the rings of openings 87 and 88 in the bottom wall 70a of the box 70. At their upper ends the ducts 96 and 97 communicate with the atmosphere, and at their lower ends these ducts communicate with the cooling chambers C–1 and C–2. In addition, the box 70 is provided to the rear of the perforated plate 90 and intermediate the rings of openings 87 and 88 with a substantially rectangular passageway 98 which extends from the top to the bottom of the box and, as clearly indicated in FIGS. 6, 7 and 8, is adapted to accommodate the chuck-operating cylinder 67 of the post inflation equipment 21a.

For purposes of a description of the operation of this system, it is assumed as a starting condition that the post inflation treatment of two tires T–1 and T–2 (FIGS. 6 and 7) supported on the upper chucks 63 is in progress. The jet air cooling apparatus 20a thus is in its lowered or solid-line position, whereby the tires T–1 and T–2 are disposed within the confines of the cooling chambers C–1 and C–2, respectively. With the blower 92 working, (for example, a 19-inch wheel diameter, radial blade fan running at 1,715 r.p.m.) air at the ambient curing room temperature, say 100° F., passes through the duct 91 at a static pressure of about 5¼ inches of water, and through the perforated distribution plate 90 into the interior of the box 70 where the pressure is about 4⅛ inches of water and from which it flows through the respective sets of openings 87 and 88 into the annular plenum chambers 85 and 86, from which in turn under a uniform static pressure of about 3⅝ inches of water it enters the cooling chambers C–1 and C–2 through the respective sets of orifices 83 and 84 at the desired volume flow rate, say about 795 cubic feet per minute. As in the case of the previously described apparatus 20, this air is directed to play principally against the tread in the shoulder regions of the tires T–1 and T–2 and thence over both the crown center region and the sidewalls to effect the desired rapid cooling of the tires, a part of the spent air leaving the cooling chambers C–1 and C–2 through the downwardly open ends thereof, and a part of the spent air leaving said chambers through the upper ends thereof via the cylindrical ducts 96 and 97. The overall air flow pattern is indicated by the arrows in FIG. 9. It is found that in the case of a 7.75 x 14/2 nylon-44 tire subjected to a dual 300 lb./100 lb. internal pressure steam cure with an external mold temperature of 326° F. in a 13.5 minutes mold cycle, the temperature at the tread-carcass interface in the shoulder regions of a so-cooled tire is reduced to the range of 150–160° F. in about 13 minutes.

Shortly prior to the termination of the concurrent mold cycle in the press, the tires which were previously subjected to post inflation and cooled on the now lower chucks 64 are deflated and released from the latter to drop onto the downwardly inclined roll conveyors 62, along which they then travel to carry-off conveyor 99 located between the legs 100 of the framework 61, as indicated diagrammatically by the dot-dash line tire T' in FIG. 6. When the press is now opened at the end of the said concurrent mold cycle, the tires then being cured are removed from the press and transferred to the location of the post inflation equipment 21a along the roll conveyors 62, as indicated diagrammatically by the dot-dash line tire T" in FIG. 6. These tires are picked up and mounted on the chucks 64 in any suitable manner, which need not be explained in detail, whereupon air is admitted thereinto to inflate the tires to the desired pressure.

As soon as this condition has been attained, the cylinders 77 are actuated to retract the piston rods 76, thereby to swing the box 70 and appurtenant parts upwardly into the broken-line position thereof shown in FIG. 6. As the box 70 reaches this position, an arm 101 (FIGS. 7 and 8) carried by the cross shaft 72 is caught by a latch 102 and at the same time comes into engagement with the actuating lever 103a of a suitable control switch 103, which causes the operating mechanism of the post inflation equipment to be actuated so as to invert the chucks by appropriate movement of the fulcrum member 65 about its axis 66. When this change-over is completed, which may be sensed, for example, by means of a limit switch (not shown) associated with the fulcrum member 65, the latch 102 is released and the cylinders 77 are reversely actuated to protract the piston rods 76, thereby to swing the box 70 and associated parts back down into the solid-line position thereof so as to cause the tires on the now upper chucks 64 to be disposed within the confines of the cooling chambers C–1 and C–2.

The cooling of these tires then proceeds as previously explained for the tires T–1 and T–2, while the latter remain on the now lower chucks 63 until shortly before the termination of the then new concurrent mold cycle in the press, at which time they are deflated and dropped onto the conveyors 62 preparatory to the arrival of the next pair of tires.

It is noted, in passing, that any tires, e.g. the tires T–1 and T–2, which have been subjected to the jet air cooling operation in the chambers C–1 and C–2, will have reached their intended relatively low temperature of about 140–160° F. in only one post inflation cycle, i.e. a period of time somewhat shorter than one full mold cycle. Theoretically, of course, they need not be kept on the now lower chucks for the described longer period of time amounting to almost two full mold cycles, but could be deflated and removed from the chucks substantially immediately after the latter are shifted from the upper or cooling position into the lower or discharge position. In actual practice, however, it is highly recommended that the tires be retained on the lower chucks as described, since this extra cooling period is found to have an appreciably beneficial effect on the road life of the tires. At the same time, no adverse effects result from the continued open air convection cooling of these tires during this period, since the cure states and the carcass cord shrinkage stresses had already reached such levels during the jet air cooling stage that any changes which might still take place in these conditions are negligible for all practical purposes.

Although in the preferred implementation of the present invention, the air flow is initially such as to impinge in the first instance substantially radially against selected regions of the tread of the tire being cooled, whereupon the air flows essentially laterally over the tread and ultimately out of the cooling chamber, our objectives can be attained as well by other types of controlled air flow, subject to the fundamental requirement that the cooling air deliver a heat transfer coefficient (as herein defined) of the required magnitude.

Merely by way of example, as diagrammatically shown in FIGS. 11 to 13 in the case of an apparatus 20b (of the class illustrated in FIGS. 1 to 4 designed for cooperation with post inflation equipment 21), the air flow into the cooling chamber defined by the two relatively separable members 31a and 32a is initially directed obliquely relative to the outer surface of the tread of the tire T then undergoing post inflation, the air as before entering at a plurality of circumferentially spaced locations. The resultant air flow in the cooling chamber thus has a circumferential circulatory component, as indicated by the arrows in FIG. 13, spent air again ultimately escaping laterally of the tire.

Although various ways to achieve this condition are available, the preferred construction we have illustrated comprises, for each of the members 31a and 32a, a channel-shaped arcuate housing 104 which is open at its circularly curved radially inward side and closed at its varyingly curved radially outward side. Welded or otherwise suitably affixed to the inner surfaces of the two side walls 105 and 106 of the housing 104 at a uniform distance from the radially innermost edges thereof is a circularly curved plate 107 provided with a plurality of spaced, transverse, parallel rows of openings 108. Each such row of openings establishes communication between the plenum chamber 109, defined at the radially outward side of the plate 107 within the housing 104, and a respective one of a set of flat nozzles 110, each of the latter being defined by a respective pair of spaced plates 111 welded or otherwise suitably secured to the radially inward side of the plate 107 and to the side walls 105 and 106 of the housing 104. As before, the cooling air is admitted into the plenum chambers 109 from the blower 43' via respective ducts 42a and 50a.

The cooling air thus leaves the plenum chambers in the form of a plurality of flat jets. In this type of arrangement, the locus of the discharge ends of the nozzles 110 is symmetrically concentric to the tire being cured and constitutes the effective boundary of the cooling chamber, but it will be understood that this locus need not be cylindrical as shown but could be transversely arcuate, e.g. concave toward the tread of the tire, through appropriate curvature of the discharge end edges of the pairs of nozzle-defining plates 111.

Alternatively, as diagrammatically shown in FIG. 14 in the case of a jet air cooling apparatus 20c designed for cooperation with post inflation equipment 21b, the air flow into the cooling chamber defined between two axially relatively separable members 112 and 113 of the apparatus 20c is initially directed countercurrently against the tire under post inflation from the opposite sides of the tread thereof. The main part of the cooling air from each such member thus flows over the tread toward the crown center of the same, ultimately escaping radially of the tire, while a minor part of the cooling air from each member flows over the respective sidewall, ultimately escaping at the bead region of the tire.

Again, various ways of achieving this condition are available. The preferred construction we have illustrated makes use of post inflation equipment having a stationary chuck structure 114 and a relatively movable chuck structure 115. The support 116 for the stationary chuck structure, which accommodates the air conduit means 117 for inflating the tire T to be cooled, also carries the member 112 of the jet air cooling apparatus 20c. The member 112 is in the shape of an annular housing defining an inner plenum chamber 118 and a surrounding distribution chamber or zone 119 separated by a perforated distribution plate 120. Similarly, the reciprocally displaceable suppport 121 for the movable chuck structure 115 also carries the member 113 which is substantially identical in shape with member 112 and defines an inner plenum chamber 122 and an outer distribution chamber or zone 123 separated by a perforated distribution plate 124. Cooling air is admitted into the two zones or chambers 119 and 123 via preferably flexible ducts 125 and 126 connected to the discharge side of a suitable blower (not shown) or other air source, and preferably annular orifices 127 and 128 are provided at the appropriate locations in the respective mated walls 118a and 122a of the members 112 and 113, which define the boundary of the cooling chamber, to enable the cooling air to enter the latter from the plenum chambers 118 and 122 in the form of a pair of annular jets.

It will be apparent, of course, that still other air flow patterns and conditions as well as other air jet configurations and orientations which achieve the desired cooling rates and uniformity of tire characteristics, could be devised and utilized in lieu of those so far described, for example incorporation of circumferential air flow in the apparatus of FIGS. 6 to 10.

The jet air cooling of tires while under post inflation in accordance with the principles of the present invention, independently of the nature of the air flow utilized, in addition of providing uniform cooling and appreciably shortening the required post inflation cycles, leads to another extremely important advantage in the manufacture of tires, to wit it makes possible a concomitant shortening of the mold cycles in such a manner that the feasibility of producing optimally cured tires remains unimpaired despite the shortened overall cure cycles and the consequent increased production rate. In general, this result is achieved by heating the tire in the press sufficiently to impart to the tire a cure state which will be a major portion of, but less than, the desired final cure state to be achieved during the cure cycle. The significance of this procedure and its relationship to the subsequent jet air cooling operation during the post inflation cycle will be clearly understood from the following, reference in this connection being had to FIG. 15 of the drawings.

In FIG. 15 the curves X, Y and Z graphically represent three plots of cure rate against time (the reference points are at the center of the shoulder section of the tread, approximately midway between the outer tread surface and the band ply, but the same considerations would apply for any other reference point) for three identical tires subjected during otherwise identical curing operations to three different external mold temperatures $\theta, \theta'$ and $\theta''$. By virtue of the nature of the plot, therefore, the area under each curve represents the total cure state reached by the respective tire, expressed in arbitrary cure units which need not be uniquely defined for the purpose of the present discussion. (In one segment of the tire industry, for example, 1 cure unit is defined as the state of cure achieved by the rubber material in the period of 1 minute at an arbitrarily selected reference temperature.) It is to be assumed, however, that at the three end points X–1, Y–1 and Z–1, representing the times when the post inflation operation is terminated, the three tires all have identical cure states of 72 units, i.e. the areas under the respective curves are equal.

Referring now first to the curve X, the same represents a standard curing and post-cure inflation cooling operation. Starting at time 0, the cure of the tire proceeds with a conventional external mold temperature $\theta$, continuing to the point X–2 which is reached after about 20 minutes and corresponds to the release of pressure in the bladder of the press (usually less than ½ minute before the press is opened). At that time, the cure of the tire has progressed about halfway to its intended end point, the area below the curve X to the left of the vertical line passing through the point X–2 being equal to 35.5 cure units, i.e. a shade less than one-half of the desired final cure.

The tire is then mounted and inflated on the post inflation equipment and permitted to cool by open air natural convection, which proceeds at a relatively low rate for a further period of about 20 minutes until at point X–1 the tire has reached the desired cure state of 72 cure units. It will be understood that the reason for the curve X flattening out as it approaches point X–1 is that over the last several minutes of the cooling period, the cure rate drops almost to zero since the tire is already at a relatively low temperatures, say in the neighborhood of about 200° F. In any event, it is readily apparent that under this method a substantial part (actually more than 50%) of the desired cure state of the tire is achieved after the pressure is released in the bladder and the tire taken out of the mold, and since, as previously pointed out, open air natural convection cooling in a tire curing room cannot possibly be uniform around the circumference of the tire, the exact state of cure at all points of the tire is not properly controlled. The result is a tire which is more likely than not characterized by excessive dimensional instability, i.e. circumferential non-uniformity of radial dimension, as well as by circumferentially non-uniform cure states and, in the case of a tire reinforced by a carcass of heat-shrinkable fiber tire cords, also by circumferentially non-uniform cord stress conditions.

This deficiency in the known tire manfacturing operation is effectively eliminated by our invention, since by virtue of the markedly superior efficiency of our jet air cooling process we are now able to precede the post inflation cycle with a mold cycle in which the rubber portions of the tire are heated sufficiently to ensure that a major portion generally within the range mentioned above and preferably on the order of about 65 to 75%, of the desired cure state is achieved in a shorter time in the mold under the precisely controlled conditions existing therein, and that the remaining minor portion of the desired cure state achieved out of the mold is also brought about in a shorter time as well as under precisely controlled conditions so as to be circumferentially uniform at any given radial dimension of the tire.

These advantages of our invention are clearly illustrated by the curves Y and Z in FIG. 15, the former representing a tire cure utilizing an external mold temperature $\theta'$ somewhat higher than the conventional mold temperature $\theta$ and followed by jet air cooling of the tire during post inflation, and the latter representing a tire cure utilizing an even higher external mold temperature $\theta''$ followed by an approximately higher rate of jet air cooling. Thus, the temperatures $\theta'$ and $\theta''$ are such that after periods of only about 17 and 13.5 minutes the areas under the curves Y and Z to the left of the vertical lines passing through the points Y-2 and Z-2 are equal to 48.5 and 51 cure units, respectively, clearly major proportions of the desired cure states of 72 units. Accordingly, the states of cure at the start of the subsequent jet air cooling operations are such that the desired cure states of 72 units can be reached, and the post inflation cycles can be terminated, at points Y-1 and Z-1 after only 13 and 7½ minutes, respectively, following the release of pressure in the bladder.

It will be readily apparent, therefore, that the implementation of our invention as aforesaid is not only conductive to the production of more tires which are characterized by circumferentially substantially uniform thermal, physical and geometrical properties to a high degree, but also enables both the mold and post inflation cycles, and thus the overall curing cycles, to be substantially shortened, whereby the achievement of major economies in tire manufacture becomes a realizable goal.

In the preceding discussion, the cure state at the thickest parts of the tire has been used as the frame of reference, which generally means the tread in the shoulder regions of the tire. The implementation of the present invention, however, automatically results in the achievements of optimum cure states at other, thinner parts of the tires as well, which generally means the sidewalls, since the jet air cooling conditions would normally have been first properly predetermined, adjusted and optimized, with due consideration given to such factors as air temperature and velocity, orifice size and distribution and arrangement, tire size and type and temperature, duration of the mold and post inflation cycles, and others not necessary to reiterate and itemize in detail at this point, to ensure that by the end of the post inflation cycle the desired final cure state will have been reached both at the tread and at the sidewalls.

It is to be understood that the foregoing description of preferred apparatus and process aspects of the present invention is for purposes of illustration only, and that the structural and operational features, characteristics and relationships disclosed herein may be changed and modified in a number of ways, as, for example, by the substitution of dual units for single units and vice versa, none of which entails a departure from the spirit and scope of the present invention as defined in the hereto appended claims.

Having thus described our invention, what we claim and desire to secure by Letters Patent is as follows:

1. In the process of producing a pneumatic tire, wherein the tire is subjected to a cure cycle including a mold cycle while in the press and a post inflation cycle after being removed from the press for achieving a desired final cure state of the tire at the completion of said cure cycle, the improvement comprising the steps of:
   (a) heating the tire in the press for a predetermined period of time which is sufficient to impart to the tire during said mold cycle a cure state which will be a major portion of, but less than, said desired final cure state to be achieved during said cure cycle;
   (b) thereafter, during said post inflation cycle, effecting a controlled flow of cooling air against and over the exterior of the tire simultaneously along the entire circumference thereof, said cooling air being forced under pressure through an orifice arrangement juxtaposed to the tread region of the tire under post inflation and thereby directed so as to be initially incident in a plural air jet form against the tire in the tread region thereof simultaneously along the entire circumference of the tire and flowing thence at least in part over the tire in the sidewall regions thereof simultaneously along the entire circumference of the tire, for effecting a rapid and controlled cooling of the tire, said pressure on said cooling air being coordinated with the open area of said orifice arrangement, the disposition of the latter relaive to the tire, and the temperature difference between said cooling air and the tire to provide air flow conditions sufficient to achieve in the vicinity of the initial contact of said cooling air with the tire a tire to air heat transfer coefficient ranging from about 15 to about 70 B.t.u./hr./sq. ft./° F.; and
   (c) adjusting the duration of such jet air cooling to a value not more than said predetermined period of time but sufficient to ensure that, despite said rapid cooling of the tire under post inflation, the remaining portion of said desired final cure state is achieved in the course of the jet air cooling period of said post inflation cycle;
   (d) whereby the finished tire is characterized by an optimized set of circumferentially substantially uniform thermal, physical and geometrical properties.

2. The process of claim 1, wherein said cooling air is initially at a temperature below about 120° F.

3. The process of claim 1, wherein said cooling air is drawn from and is initially at the ambient temperature of the curing room atmosphere.

4. The process of claim 1, wherein said cooling air is initially drawn from and is at the ambient temperature of the atmosphere outside of the curing room.

5. The process of claim 1, wherein said cooling air is delivered to the location of the tire under post inflation at a volume flow rate of at least about 500 cubic feet per minute.

6. The process of claim 1, wherein said cooling air is delivered to the location of the tire under post inflation at a static pressure of between about 1 and 7 inches of water.

7. The process of claim 1, wherein said orifice arrangement provides at least one row of a multiplicity of cooling air jets distributed circumferentially of the tread of the tire under post inflation.

8. The process of claim 1, wherein said cooling air jets are directed to impinge initially against the tread of the tire.

9. The process of claim 8, wherein additional cooling air jets are directed to impinge initially against the radially outwardmost portions of each of the sidewalls of the tire concurrently with the impingement of said first-named cooling air jets against the tread.

10. The process of claim 8, wherein said cooling air jets are directed generally radially of the tire under post inflation so as to impinge against the tread thereof substantially normally to the surface of the latter.

11. The process of claim 10, wherein said cooling air jets are arranged so as to impinge against the tread in the two shoulder regions thereof on opposite sides of the crown centerline of the tire.

12. The process of claim 8, wherein said cooling air jets are directed generally obliquely to the radial planes of the tire under post inflation so as to impinge against the tread thereof at an acute angle to the surface of the latter.

References Cited

UNITED STATES PATENTS

| | | | |
|---|---|---|---|
| 3,039,839 | 6/1962 | Waters et al. | 264—100 |
| 3,065,499 | 11/1962 | Brundage et al. | 18—2 TP |
| 3,008,180 | 11/1961 | Woodhall | 18—2 |
| 2,963,737 | 12/1960 | Soderquist | 18—2 TP |
| 3,075,237 | 1/1963 | Soderquist | 18—2 TP |
| 3,170,187 | 2/1965 | Brundage | 18—2 TP |
| 3,214,790 | 11/1965 | Wright et al. | 18—2 TP |
| 3,276,930 | 10/1966 | Roy Keefe, Jr. | 18—2 TP |
| 2,635,293 | 4/1953 | Prance | 264—236 |

FOREIGN PATENTS

| | | | |
|---|---|---|---|
| 582,886 | 9/1959 | Canada | 264—100 |

OTHER REFERENCES

Data Book (Refrigerating), IInd ed., 1934, American Society of Refrigerating Engineers, p. 111.

Brown et al.: Unit Operations, Wiley Press, 1950, pp. 418 and 425.

ROBERT F. WHITE, Primary Examiner

J. H. SILBAUGH, Assistant Examiner

U.S. Cl. X.R.

264—236, 237